United States Patent
Shimada et al.

(10) Patent No.: US 9,499,151 B2
(45) Date of Patent: Nov. 22, 2016

(54) BRAKE SYSTEM FOR VEHICLE

(71) Applicant: HONDA MOTOR CO., LTD., Minato-Ku, Tokyo (JP)

(72) Inventors: Takashi Shimada, Wako (JP); Soichiro Ueura, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 14/822,266

(22) Filed: Aug. 10, 2015

(65) Prior Publication Data

US 2016/0039401 A1   Feb. 11, 2016

(30) Foreign Application Priority Data

Aug. 11, 2014 (JP) ................................ 2014-163847

(51) Int. Cl.
*B60T 13/68* (2006.01)
*B60T 8/40* (2006.01)
*B60T 13/14* (2006.01)
*B60T 7/04* (2006.01)
(Continued)

(52) U.S. Cl.
CPC .............. *B60T 13/686* (2013.01); *B60T 7/042* (2013.01); *B60T 8/4081* (2013.01); *B60T 8/4086* (2013.01); *B60T 13/146* (2013.01); *B60T 13/662* (2013.01); *B60T 13/745* (2013.01)

(58) Field of Classification Search
CPC .. B60T 13/686; B60T 13/662; B60T 13/146; B60T 13/745; B60T 7/042; B60T 8/4086
See application file for complete search history.

(56) References Cited

U.S. PATENT DOCUMENTS

| 6,019,438 A * | 2/2000 | Sawada | B60T 7/042 303/113.4 |
| 6,142,581 A * | 11/2000 | Yamaguchi | B60T 7/12 303/113.2 |
| 8,991,941 B2 * | 3/2015 | Gotoh | B60T 8/4081 303/116.1 |

(Continued)

FOREIGN PATENT DOCUMENTS

| EP | 0428320 A1 | 5/1991 |
| EP | 0784002 A1 | 7/1997 |

(Continued)

OTHER PUBLICATIONS

European Search Report dated Nov. 19, 2015 corresponding to European Patent Application No. 15180520.7.

(Continued)

*Primary Examiner* — Vishal Sahni
(74) *Attorney, Agent, or Firm* — Carrier Blackman & Associates, P.C.; William D. Blackman; Jingli Wang (57) ABSTRACT

Provided is a brake system for a vehicle including an input side hydraulic system, an output side hydraulic system, a first and a second shutoff valves to shut off flowing of the brake fluid between the input side hydraulic system and the output side hydraulic system when closed, a first and a second out-valves through which the brake fluid flows into a reservoir unit when opened, and a control unit to control a motor cylinder device of the output side hydraulic system to generate the brake fluid pressure according to the operational amount of a brake pedal. The control unit opens one or both of the first and the second shutoff valves and the first and the second out-valves when output characteristic of the brake fluid pressure generated by the motor cylinder device shifts from basic characteristic.

8 Claims, 5 Drawing Sheets

(51) Int. Cl.
*B60T 13/66* (2006.01)
*B60T 13/74* (2006.01)

(56) References Cited

U.S. PATENT DOCUMENTS

| | | | |
|---|---|---|---|
| 2008/0210496 A1* | 9/2008 | Ishii | B60T 7/042 188/1.11 E |
| 2012/0151914 A1* | 6/2012 | Nishioka | B60T 7/042 60/545 |
| 2015/0274143 A1 | 10/2015 | Miyazaki et al. | |
| 2015/0291140 A1 | 10/2015 | Ishida | |

FOREIGN PATENT DOCUMENTS

| | | |
|---|---|---|
| JP | 2013-075605 A | 4/2013 |
| WO | 2014/068658 A1 | 5/2014 |
| WO | 2014065322 A1 | 5/2014 |

OTHER PUBLICATIONS

Office Action communicated Dec. 11, 2015 corresponding to European Patent Application No. 15180520.7.
Office Action dated May 10, 2016, issued in the corresponding Japanese Patent Application 2014-163847.

\* cited by examiner

BRAKE SYSTEM FOR VEHICLE

CROSS REFERENCE TO RELATED APPLICATION

This application claims the foreign priority benefit under Title 35, United States Code, 119 (a)-(d) of Japanese Patent Application No. 2014-163847 which is filed on Aug. 11, 2014 with the Japan Patent Office, the disclosure of which is herein incorporated by reference in its entirety.

BACKGROUND OF THE INVENTION

1. Technical Field

The present invention relates to a brake system for a vehicle.

2. Description of Background Art

In the following patent literature 1, a brake system for a vehicle, which generates frictional braking force by using brake fluid pressure generated by a motor cylinder device (fluid pressure generating device), is described. The motor cylinder device drives a piston (actuator) by using an electric motor to be controlled by a control unit, so that the brake fluid pressure is generated on the brake fluid.

Patent literature 1: Japanese Unexamined Patent Publication No. 2013-075605

BRIEF SUMMARY OF THE INVENTION

The brake system for a vehicle described in the patent literature 1 generates the frictional braking force by actuating a disk brake mechanism by using the brake fluid pressure. The disk brake mechanism generates frictional heat when the frictional braking force is generated. The temperature of the brake fluid rises by heating the brake fluid with the frictional heat, so that the brake fluid expands.

When the brake fluid pressure is generated by the motor cylinder device, master-cut valves (a first shutoff valve, a second shutoff valve) are closed to shut off the brake fluid pressure generated by pressing-down operation to a brake pedal. Thereby, a hydraulic system equipped with the motor cylinder device and the disk brake mechanism becomes a closed system. Hence, if the brake fluid expands, the brake fluid pressure to be generated by the motor cylinder device becomes higher. Therefore, the disk brake mechanism is actuated by fluid pressure higher than the brake fluid pressure to be generated by the motor cylinder device, so that there arises a problem that the accuracy of the braking force to be generated decreases.

In order to solve the above problem, the object of the present invention is to provide a brake system for a vehicle capable of reducing decrease of the accuracy of the braking force due to the expansion of the brake fluid.

In order to achieve the object, the present invention provides a brake system for a vehicle including two hydraulic systems of an input side hydraulic system and an output side hydraulic system, each of the two hydraulic systems being capable of generating brake fluid pressure on brake fluid, including:

an input device to generate the brake fluid pressure according to an operational amount of an operation piece, the input device being disposed in the input side hydraulic system;

a fluid pressure generating device to generate the brake fluid pressure according to an operational amount of an actuator, the fluid pressure generating device being disposed in the output side hydraulic system;

a master-cut valve to flow the brake fluid between the input side hydraulic system and the output side hydraulic system when opened, and to shut off flowing of the brake fluid between the input side hydraulic system and the output side hydraulic system when closed;

an out-valve through which the brake fluid can flow into a reservoir unit when opened; and a control unit which, when the operation piece is operated, closes the master-cut valve and the out-valve and controls the actuator to generate the brake fluid pressure according to the operational amount of the operation piece, wherein the control unit opens one or both of the master-cut valve and the out-valve when the control unit determines that output characteristic of the brake fluid pressure according to the operational amount of the actuator shifts from basic characteristic set beforehand.

According to the present invention, in the brake system for a vehicle that the brake fluid pressure according to the operational amount of the actuator is generated by the fluid pressure generating device in the output side hydraulic system, the output side hydraulic system and the input side hydraulic system communicate with each other when the output characteristic of the brake fluid pressure according to the operational amount of the actuator shifts from the basic characteristic set beforehand. Or the brake fluid can flow into the reservoir unit when the output characteristic of the brake fluid pressure shifts from the basic characteristic. For example, when the brake fluid of the output side hydraulic system expands because of heating or the like, the brake fluid pressure rises, so that the output characteristic of the brake fluid pressure to be generated by the fluid pressure generating device shifts from the basic characteristic. In such a case, the brake fluid of the output side hydraulic system is flown into the input side hydraulic system or the reservoir unit, and then rising of the brake fluid pressure due to the expansion of the brake fluid is restrained, so that the fluid pressure generating device can generate the brake fluid pressure on the output characteristic close to the basic characteristic.

Furthermore, the control unit according to the brake system for a vehicle of the present invention opens the master-cut valve when the control unit determines that the output characteristic shifts from the basic characteristic.

According to this invention, when the output characteristic of the brake fluid pressure generated by the fluid pressure generating device shifts from the basic characteristic, the output side hydraulic system communicates with the input side hydraulic system. Even when the brake fluid of the output side hydraulic system expands to rise the brake fluid pressure, the rising of the brake fluid pressure due to the expansion is restrained by flowing of the brake fluid into the input side hydraulic system, so that the fluid pressure generating device disposed in the output side hydraulic system can generate the brake fluid pressure on the output characteristic close to the basic characteristic.

Furthermore, the control unit of the brake system for a vehicle according to the present invention restricts the operational amount of the actuator when the control unit determines that the output characteristic shifts from the basic characteristic and opens the master-cut valve.

When the brake fluid pressure rises because of the operation of the actuator in the open state of the master-cut valve or the out-valve, the brake fluid of the output side hydraulic system flows into the input side hydraulic system or the reservoir unit. As the operational amount of the actuator is larger, the brake fluid pressure generated by the fluid pressure generating device is higher, so that the amount of the brake fluid flown into the input side hydraulic system or the reservoir unit increases.

According to this invention, the operational amount of the actuator is restricted. Therefore, the amount of the brake fluid flown into the input side hydraulic system or the reservoir unit is restrained, so that a shortage of the brake fluid of the output side hydraulic system is restrained.

Furthermore, the control unit of the brake system for a vehicle according to the present invention determines that the output characteristic shifts from the basic characteristic when the output characteristic shifts to a higher pressure side than the basic characteristic.

According to this invention, the master-cut valve or the out-valve is opened when the brake fluid pressure generated by the fluid pressure generating device is higher than that on the basic characteristic. Because the brake fluid flows into the input side hydraulic system or the reservoir unit, the brake fluid pressure generated by the fluid pressure generating device becomes lower, so that the output characteristic on which the fluid pressure generating device generates the brake fluid pressure approaches the basic characteristic.

According to the present invention, a brake system for a vehicle capable of reducing decrease of the accuracy of the braking force due to an expansion of the brake fluid can be provided.

BRIEF DESCRIPTION OF THE SEVERAL VIEWS OF THE DRAWING

Certain preferred embodiments of the present invention will now be described in greater detail by way of example only and with reference to the attached drawings, in which.

DETAILED DESCRIPTION OF THE INVENTION

An embodiment of the present invention will be described in detail with reference to the attached drawings.

Figure 1:
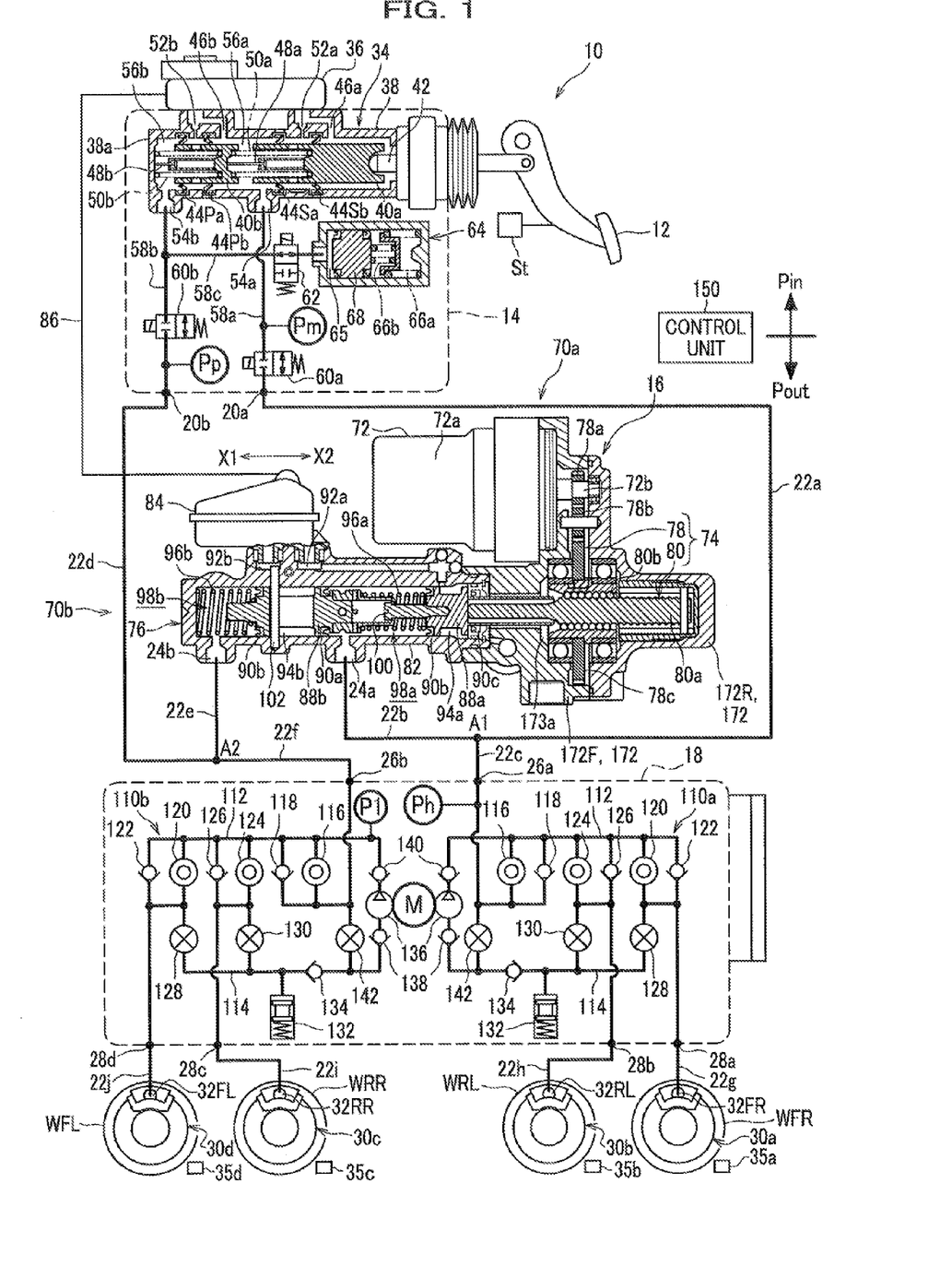
FIG. 1 is a schematic constitution view of a brake system for a vehicle.

FIG. 1 is a schematic constitution view of a brake system for a vehicle.

As shown in FIG. 1, the brake system 10 for a vehicle of this embodiment includes an input device 14, a pedal stroke sensor St, a motor cylinder device 16, and a vehicle movement stability device 18 (Hereinafter, this is referred to as a VSA (vehicle stability assist) device 18. "VSA" is a registered trademark).

The input device 14 compresses a hydraulic fluid (brake fluid) in accordance with the operational input when an operation piece like a brake pedal 12 is operated by a driver, so that fluid pressure (brake fluid pressure) is generated on the brake fluid in accordance with the operational amount. The pedal stroke sensor St detects the operational amount (pedal stroke) when the brake pedal 12 is pressed down. The motor cylinder device 16 generates operational pressure (brake fluid pressure) on the hydraulic fluid (brake fluid), which operational pressure is supplied into wheel cylinders 32FR, 32RL, 32RR, 32FL of wheels (right front wheel WFR, left rear wheel WRL, right rear wheel WRR, left front wheel WFL). The VSA device 18 supports stability of vehicle's behavior.

The input device 14, the motor cylinder device 16, and the VSA device 18 are connected via ducts (hydraulic passages), for example, formed of tube members like hoses or tubes. Furthermore, as a by-wire brake system, the input device 14 and the motor cylinder device 16 are electrically connected with a harness not shown.

The hydraulic passages will be explained hereinafter. With reference to a connecting point A1 in FIG. 1 (a little lower than the middle), the connecting point A1 and a connecting port 20*a* of the input device 14 are connected with a first piping tube 22*a*. And the connecting point A1 and an output port 24*a* of the motor cylinder device 16 are connected with a second piping tube 22*b*. And furthermore, the connecting point A1 and a lead-in port 26*a* of the VSA device 18 are connected with a third piping tube 22*c*.

With reference to another connecting point A2 in FIG. 1, the connecting point A2 and another connecting port 20*b* of the input device 14 are connected with a fourth piping tube 22*d*. And the connecting point A2 and another output port 24*b* of the motor cylinder device 16 are connected with a fifth piping tube 22*e*. And furthermore, the connecting point A2 and another lead-in port 26*b* of the VSA device 18 are connected with a sixth piping tube 22*f*.

The VSA device 18 is provided with a plurality of lead-out ports 28*a* to 28*d*. The first lead-out port 28*a* is connected via a seventh piping tube 22*g* to the wheel cylinder 32FR of a disc brake mechanism 30*a* provided on the right front wheel WFR. The second lead-out port 28*b* is connected via a eighth piping tube 22*h* to the wheel cylinder 32RL of a disc brake mechanism 30*b* provided on the left rear wheel WRL. The third lead-out port 28*c* is connected via a ninth piping tube 22*i* to the wheel cylinder 32RR of a disc brake mechanism 30*c* provided on the right rear wheel WRR. The fourth lead-out port 28*d* is connected via a tenth piping tube 22*j* to the wheel cylinder 32FL of a disc brake mechanism 30*d* provided on the left front wheel WFL.

In this case, the brake fluid is supplied via the piping tubes 22*g* to 22*j* connected to the respective lead-out ports 28*a* to 28*d*, to the respective wheel cylinders 32FR, 32RL, 32RR, 32FL of the disc brake mechanisms 30*a* to 30*d*. And brake fluid pressure in each of the wheel cylinders 32FR, 32RL, 32RR, 32FL rises. Thereby, each of the wheel cylinders 32FR, 32RL, 32RR, 32FL is operated, and braking force is given to the corresponding wheel (WFR, WRL, WRR, WFL) with high frictional force between the corresponding disc brake mechanism and the corresponding wheel.

Furthermore, wheel speed sensors 35*a*, 35*b*, 35*c*, 35*d* to detect each wheel speed are provided to the right front wheel WFR, the left rear wheel WRL, the right rear wheel WRR, the left front wheel WFL, respectively. Measurement result signals, which are generated on the wheel speed sensors 35*a*, 35*b*, 35*c*, 35*d* when these sensors detect wheel speeds of the wheels, are input into a control unit 150.

The input device 14 includes a master cylinder 34 of tandem type which can generate fluid pressure (brake fluid pressure) according to the operation of the brake pedal 12 by the driver, and a reservoir (first reservoir 36) attached to the master cylinder 34. Two pistons (secondary piston 40*a*, primary piston 40*b*), which are spaced by a prescribed distance from each other along an axial direction of a cylinder tube 38 of the master cylinder 34, are disposed slidably in the cylinder tube 38 of the master cylinder 34. The secondary piston 40a is arranged close to the brake pedal 12, and is connected to the brake pedal 12 via a push rod 42. Furthermore, the primary piston 40b is arranged farther away from the brake pedal 12 than the secondary piston 40a.

A pair of cup seals 44Pa, 44Pb and another pair of cup seals 44Sa, 44Sb are attached to an inner surface of the cylinder tube 38. The pair of cup seals 44Pa, 44Pb have ring shapes, and are touch with an outer surface of the primary piston 40b. The pair of cup seals 44Sa, 44Sb have ring shapes, and are touch with an outer surface of the secondary piston 40a. Moreover, a spring member 50a is disposed between the secondary piston 40a and the primary piston 40b. And another spring member 50b is disposed between the primary piston 40b and an end portion 38a on a closed end side of the cylinder tube 38.

A guide rod 48b is lengthened along a sliding direction of the primary piston 40b from the end portion 38a of the cylinder tube 38, and the primary piston 40b slides while being guided by the guide rod 48b.

Furthermore, a guide rod 48a is lengthened along a sliding direction of the secondary piston 40a from an end portion of the primary piston 40b on the side of the secondary piston 40a, and the secondary piston 40a slides while being guided by the guide rod 48a.

And furthermore, the secondary piston 40a and the primary piston 40b are connected via the guide rod 48a, and arranged in series.

The cylinder tube 38 of the master cylinder 34 is provided with two supply ports (second supply port 46a, first supply port 46b), two relief ports (second relief port 52a, first relief port 52b), and two output ports 54a, 54b. In this case, the second supply port 46a and the second relief port 52a are joined together, and the first supply port 46b and the first relief port 52b are joined together, and then they communicate with a reservoir chamber not shown in the first reservoir 36.

Furthermore, the respective seals of the pair of cup seals 44Sa, 44Sb being touch with the outer surface of the secondary piston 40a are arranged on both sides of the second relief port 52a in the sliding direction of the secondary piston 40a. And the respective seals of the pair of cup seals 44Pa, 44Pb being touch with the outer surface of the primary piston 40b are arranged on both sides of the first relief port 52b in the sliding direction of the primary piston 40b.

Moreover, a first pressure chamber 56b and a second pressure chamber 56a, which generate brake fluid pressure corresponding to a pedal effort of the driver on the brake pedal 12, are provided in the cylinder tube 38 of the master cylinder 34. The second pressure chamber 56a communicates with the connecting port 20a via a second hydraulic passage 58a. The first pressure chamber 56b communicates with the other connecting port 20b via a first hydraulic passage 58b.

A gap between the first pressure chamber 56b and the second pressure chamber 56a is sealed liquid-tightly by the pair of cup seals 44Pa, 44Pb. And a space on the brake pedal 12 side of the second pressure chamber 56a is sealed liquid-tightly by the pair of cup seals 44Sa, 44Sb.

The first pressure chamber 56b generates brake fluid pressure according to displacement of the primary piston 40b, and the second pressure chamber 56a generates brake fluid pressure according to displacement of the secondary piston 40a.

Furthermore, the secondary piston 40a is connected to the brake pedal 12 via the push rod 42 to move in the cylinder tube 38 according to the movement of the brake pedal 12. And furthermore, the primary piston 40b moves according to the brake fluid pressure generated in the second pressure chamber 56a according to the displacement of the secondary piston 40a. That is, the primary piston 40b moves according to the movement of the secondary piston 40a.

A pressure sensor Pm is disposed between the master cylinder 34 and the connection port 20a and on the upstream side of the second hydraulic passage 58a. And a second shutoff valve 60a composed of a normally-open type solenoid valve is disposed on the downstream side of the second hydraulic passage 58a. The pressure sensor Pm detects brake fluid pressure on the upstream side closer to the master cylinder 34 than the second shutoff valve 60a in the second hydraulic passage 58a.

A first shutoff valve 60b composed of a normally-open type solenoid valve is disposed between the master cylinder 34 and the other connection port 20b and on the upstream side of the first hydraulic passage 58b. And a pressure sensor Pp is disposed on the downstream side of the first hydraulic passage 58b. The pressure sensor Pp detects fluid pressure on the downstream side closer to the wheel cylinders 32FR, 32RL, 32RR, 32FL than the first shutoff valve 60b in the first hydraulic passage 58b.

Note that, in this embodiment, master-cut valves includes the second shutoff valve 60a and the first shutoff valve 60b.

Each of the master-cut valves (second shutoff valve 60a, first shutoff valve 60b) may be a solenoid valve which can switch to an open state and to a closed state, or may be an opening adjustment valve like a drive-by-wire valve (DBW valve) to be driven by a stepping motor (not shown) or the like.

In the case of solenoid valve, the opening degree of the master-cut valve is adjusted by adjusting a duty ratio of a given control signal (current signal or voltage signal).

The "normally-open" for the master-cut valves (second shutoff valve 60a, first shutoff valve 60b) means a valve configured so that the normal position (position of a valve element when not energized) is in an opened position state (normally open). Note that, in FIG. 1, each of the first shutoff valve 60b and the second shutoff valve 60a shows a valve-closed state in which the solenoid is energized to actuate the valve element (not shown).

A branch hydraulic passage 58c branched from the first hydraulic passage 58b is provided to the first hydraulic passage 58b between the master cylinder 34 and the first shutoff valve 60b. And in the branch hydraulic passage 58c, a third shutoff valve 62 composed of a normally-closed type solenoid valve and a stroke simulator 64 are connected in series with each other. The "normally-closed" for the third shutoff valve 62 means a valve configured so that the normal position (position of a valve element when not energized) is in a closed position state (normally closed). Note that, in FIG. 1, the third shutoff valve 62 shows a valve-open state in which the solenoid is energized to actuate the valve element (not shown).

The stroke simulator 64 is a device, which allows a pedal stroke and generates a reaction force against a pressing-down operation for the brake pedal 12 at the time of by-wire control, to make the operator feel as if the pedal effort generates braking force. And the stroke simulator 64 is arranged on the first hydraulic passage 58b, which position is closer to the master cylinder 34 than the first shutoff valve 60b. The stroke simulator 64 is provided with a hydraulic chamber 65 communicating with the branch hydraulic passage 58c. Brake fluid, which is ejected from the first pressure chamber 56b of the master cylinder 34, is introduced into the hydraulic chamber 65 via the branch hydraulic passage 58c.

Moreover, the stroke simulator 64 is provided with a first return spring 66a, a second return spring 66b, and a simulator piston 68.

The first return spring 66a and the second return spring 66b are arranged in series with each other. The spring constant of the first return spring 66a is larger than that of the second return spring 66b. The simulator piston 68 is urged by the first return spring 66a and the second return spring 66b. And the stroke simulator 64 makes an increase gradient of the pedal reaction force low in the former half of the pressing-down operation for the brake pedal 12, and makes the pedal reaction force high in the latter half. Thereby, the pedal feeling for the brake pedal 12 becomes the same as the pedal feeling when the driver presses down to operate the master cylinder 34.

That is, the stroke simulator 64 generates a reaction force corresponding to brake fluid pressure ejected from the first pressure chamber 56b, and gives the reaction force to the brake pedal 12 via the master cylinder 34.

The hydraulic passage is roughly classified into a second hydraulic system 70a which connects the second pressure chamber 56a of the master cylinder 34 with the plurality of wheel cylinders 32FR, 32RL, and a first hydraulic system 70b which connects the first pressure chamber 56b of the master cylinder 34 with the plurality of wheel cylinders 32RR, 32FL.

The second hydraulic system 70a includes the second hydraulic passage 58a of the input device 14 and the piping tubes 22a, 22b, 22c, 22g, 22h.

The first hydraulic system 70b includes the first hydraulic passage 58b of the input device 14 and the piping tubes 22d, 22e, 22f, 22i, 22j.

The motor cylinder device 16 includes an electric motor 72, an actuator mechanism 74, and a cylinder mechanism 76 to be urged by the actuator mechanism 74. The motor cylinder device 16 operates as a fluid pressure generating device in this embodiment.

Furthermore, in this embodiment, an actuator includes the electric motor 72 and the actuator mechanism 74.

The actuator mechanism 74 is disposed on the side of an output shaft 72b of the electric motor 72, and includes a gear mechanism (reduction mechanism) 78 and a ball screw structure 80. The gear mechanism 78 is composed of a plurality of gears engaged with each other to transmit the rotational force of the electric motor 72. The ball screw structure 80 includes a ball screw shaft 80a and balls 80b, which shaft 80a advances and retreats along the axial direction by receiving the rotational force of the electric motor 72 via the gear mechanism 78.

In this embodiment, the ball screw structure 80 is housed together with the gear mechanism 78 in a mechanism housing portion 173a of an actuator housing 172.

The cylinder mechanism 76 includes the cylinder body 82 having a substantially cylindrical shape, and a second reservoir 84 attached to the cylinder body 82. The second reservoir 84 is connected with the first reservoir 36 attached to the master cylinder 34 of the input device 14 via a piping tube 86, so that brake fluid reserved in the first reservoir 36 is supplied into the second reservoir 84 via the piping tube 86. Note that, a tank to reserve the brake fluid may be equipped to the piping tube 86.

An open end of the cylinder body 82 having a substantially cylindrical shape is fitted to the actuator housing 172 composed of a housing body 172F and a housing cover 172R, so that the cylinder body 82 and the actuator housing 172 are connected with each other, hereby the motor cylinder device 16 is composed.

Two slave pistons (first slave piston 88b, second slave piston 88a), which are apart from each other by a prescribed distance along the axial direction of the cylinder body 82, are disposed in the cylinder body 82 so as to be capable of sliding. The second slave piston 88a is arranged on the side of the ball screw structure 80, and close to the ball screw structure 80. And the second slave piston 88a moves in the direction X1 or X2 together with the ball screw shaft 80a while abutting against one end of the ball screw shaft 80a. Furthermore, the first slave piston 88b is arranged apart from the ball screw structure 80 more than the second slave piston 88a.

Hereinafter, the side of the direction X1 is the front, and the side of the direction X2 is the rear.

The electric motor 72 in this embodiment is composed by being covered with a motor casing 72a formed separately from the cylinder body 82. The electric motor 72 is arranged so that the output shaft 72b is substantially parallel with the sliding direction (axial direction) of the second slave piston 88a and the first slave piston 88b.

The rotational force of the output shaft 72b is transmitted to the ball screw structure 80 via the gear mechanism 78.

The gear mechanism 78 includes, for example, three gears of a first gear 78a, a third gear 78c and a second gear 78b. The first gear 78a is attached to the output shaft 72b of the electric motor 72. The third gear 78c rotates the balls 80b around the axis of the ball screw shaft 80a, which balls drive the ball screw shaft 80a forward and rearward in the axial direction of the ball screw shaft, and the third gear 78c rotates around the axis of the ball screw shaft 80a. The second gear 78b transmits the rotation of the first gear 78a to the third gear 78c.

The actuator mechanism 74 in this embodiment converts the rotational force of the output shaft 72b of the electric motor 72 into the forward-rearward driving force (linear force) of the ball screw shaft 80a. And the movement amount when the ball screw shaft 80a advances or retreats is an operational amount of the actuator in this embodiment.

A pair of cup seals 90a, 90b are attached to the outer peripheral surface of the first slave piston 88b via an annular step portion. A first back chamber 94b, which communicates with a reservoir port 92b to be described later, is formed between the pair of cup seals 90a, 90b.

Furthermore, a second return spring 96a is disposed between the second slave piston 88a and the first slave piston 88b, and a first return spring 96b is disposed between the first slave piston 88b and the closed end portion of the cylinder body 82.

An annular guide piston 90c is disposed behind the second slave piston 88a. The annular guide piston 90c seals liquid-tightly between the outer peripheral surface of the second slave piston 88a and the mechanism housing portion 173a, and guides the second slave piston 88a to move in the axial direction thereof. The guide piston 90c operates as a seal member to close the cylinder body 82. A slave cup seal not shown is attached to the inner peripheral surface of the guide piston 90c in which the second slave piston 88a moves. It is preferred that the gap between the second slave piston 88a and the guide piston 90c is constituted to be liquid-tight by using the slave cup seal. Furthermore, a slave cup seal 90b is attached to the front outer peripheral surface of the second slave piston 88a via an annular step portion.

By the above-described constitution, the brake fluid filled in the cylinder body 82 is sealed within the cylinder body 82 with the guide piston 90c, and does not flow into the side of the actuator housing 172.

Note that, a second back chamber 94a, which communicates with a reservoir port 92a to be described later, is formed between the guide piston 90c and the slave cup seal 90b.

The cylinder body 82 of the cylinder mechanism 76 is provided with two reservoir ports 92a, 92b and two output ports 24a, 24b. In this case, the reservoir port 92a (92b) is constituted to communicate with a reservoir chamber (not shown) of the second reservoir 84.

A second hydraulic chamber 98a and a first hydraulic chamber 98b are provided in the cylinder body 82. The second hydraulic chamber 98a controls brake fluid pressure to be output to the side of the wheel cylinders 32FR, 32RL from the output port 24a. The first hydraulic chamber 98b controls brake fluid pressure to be output to the side of the wheel cylinders 32RR, 32FL from the other output port 24b.

According to this constitution, the second back chamber 94a, the first back chamber 94b, the second hydraulic chamber 98a and the first hydraulic chamber 98b, in which brake fluid is sealed, are portions in which the brake fluid in the cylinder body 82 is sealed, the portions are separated liquid-tightly (air-tightly) from the mechanism housing portion 173a of the actuator housing 172 by the guide piston 90c to operate as a seal member.

Note that, the method of attaching the guide piston 90c to the cylinder body 82 is not limited, for example, it may be a method to use a circlip (retaining ring) not shown.

A regulating means 100 is provided between the second slave piston 88a and the first slave piston 88b. The regulating means 100 regulates the maximum stroke (maximum operational amount) and the minimum stroke (minimum operational amount) of the second slave piston 88a and the first slave piston 88b. Furthermore, the first slave piston 88b is provided with a stopper pin 102. The stopper pin 102 regulates a sliding range of the first slave piston 88b to prevent an over-return to the side of the second slave piston 88a. Thereby, at the time of performing backup of braking especially by the master cylinder 34, in a case where a failure of one system happens, a failure of the other system is prevented.

The VSA device is composed of a publicly known device, and includes a second brake system 110a and a first brake system 110b. The second brake system 110a controls a second hydraulic system 70a which is connected to the disc brake mechanisms 30a, 30b (wheel cylinders 32FR, 32RL) of the right front wheel WFR and the left rear wheel WRL. The first brake system 110b controls a first hydraulic system 70b which is connected to the disc brake mechanisms 30c, 30d (wheel cylinders 32RR, 32FL) of the right rear wheel WRR and the left front wheel WFL. Note that, the second brake system 110a may be a hydraulic system which is connected to disc brake mechanisms provided to the left front wheel WFL and the right front wheel WFR, and the first brake system 110b may be a hydraulic system which is connected to disc brake mechanisms provided to the right rear wheel WRR and the left rear wheel WRL. Furthermore, the second brake system 110a may be a hydraulic system which is connected to disc brake mechanisms provided to the right front wheel WFR and the right rear wheel WRR on one side of the vehicle, and the first brake system 110b may be a hydraulic system which is connected to disc brake mechanisms provided to the left front wheel WFL and the left rear wheel WRL on the other side of the vehicle.

The second brake system 110a and the first brake system 110b have the same constitution as each other. Therefore, corresponding members between the second brake system 110a and the first brake system 110b have the same reference symbol. Furthermore, the description is done mainly about the second brake system 110a, and the description about the first brake system 110b is added with parentheses.

The second brake system 110a (first brake system 110b) has common pipe passages (first common hydraulic passage 112 and second common hydraulic passage 114) for the wheel cylinders 32FR, 32RL (32RR, 32FL). The first common hydraulic passage 112 of the two is a supply passage through which brake fluid pressure is supplied to the wheel cylinders 32FR, 32RL (32RR, 32FL).

The VSA device 18 is provided with a regulator valve 116, two in-valves (first in-valve 120, second in-valve 124), and three check valves (first check valve 118, second check valve 122, third check valve 126).

The regulator valve 116 is composed of a normally-open type solenoid valve arranged between the lead-in port 26a (26b) and the first common hydraulic passage 112. The first check valve 118 is arranged in parallel with the regulator valve 116, and allows flowing of the brake fluid to the side of the first common hydraulic passage 112 from the side of the lead-in port 26a (26b). That is, flowing of the brake fluid to the side of the lead-in port 26a (26b) from the side of the first common hydraulic passage 112 is prevented. The first in-valve 120 is composed of a normally-open type solenoid valve arranged between the first common hydraulic passage 112 and the first lead-out port 28a (fourth lead-out port 28d). The second check valve 122 is arranged in parallel with the first in-valve 120, and allows flowing of the brake fluid to the side of the first common hydraulic passage 112 from the side of the first lead-out port 28a (fourth lead-out port 28d). That is, flowing of the brake fluid to the side of the first lead-out port 28a (fourth lead-out port 28d) from the side of the first common hydraulic passage 112 is prevented. The second in-valve 124 is composed of a normally-open type solenoid valve arranged between the first common hydraulic passage 112 and the second lead-out port 28b (third lead-out port 28c). The third check valve 126 is arranged in parallel with the second in-valve 124, and allows flowing of the brake fluid to the side of the first common hydraulic passage 112 from the side of the second lead-out port 28b (third lead-out port 28c). That is, flowing of the brake fluid to the side of the second lead-out port 28b (third lead-out port 28c) from the side of the first common hydraulic passage 112 is prevented.

Furthermore, the VSA device 18 of this embodiment is provided with a pressure sensor P1. The pressure sensor P1 measures the brake fluid pressure in the first common hydraulic passage 112. The measurement signals measured with the pressure sensor P1 are input into the control unit 150.

The first in-valve 120 and the second in-valve 124 are open-close units to open and close a pipe passage (first common hydraulic passage 112) through which the brake fluid pressure is supplied to the wheel cylinders 32FR, 32RL 32RR, 32FL. And in the case where the first in-valve 120 is closed, supply of the brake fluid to the wheel cylinders 32FR, 32FL from the first common hydraulic passage 112 is shut off. Furthermore, in the case where the second in-valve 124 is closed, supply of the brake fluid to the wheel cylinders 32RR, 32RL from the first common hydraulic passage 112 is shut off.

Furthermore, the VSA device 18 is provided with two out-valves (also referred to herein as outlet valves, including a first out-valve 128, and a second out-valve 130). The VSA device further includes a reservoir unit 132, a fourth check valve 134, a pump 136, a suction valve 138, a discharge valve 140, a motor M, and a suction valve 142.

The first out-valve 128 is a normally-closed type solenoid valve arranged between the first lead-out port 28a (fourth lead-out port 28d) and the second common hydraulic passage 114. The second out-valve 130 is a normally-closed type solenoid valve arranged between the second lead-out port 28b (third lead-out port 28c) and the second common hydraulic passage 114.

The reservoir unit 132 is connected to the second common hydraulic passage 114. The fourth check valve 134 is arranged between the first common hydraulic passage 112 and the second common hydraulic passage 114, and allows flowing of the brake fluid to the side of the first common hydraulic passage 112 from the side of the second common hydraulic passage 114. That is, flowing of the brake fluid to the side of the second common hydraulic passage 114 from the side of the first common hydraulic passage 112 is prevented. The pump 136 is arranged between the fourth check valve 134 and the first common hydraulic passage 112, flows the brake fluid to the side of the first common hydraulic passage 112 from the side of the second common hydraulic passage 114. The discharge valve 140 and the suction valve 138 are respectively disposed in front of and behind the pump 136. The motor M drives the pump 136. The suction valve 142 is a normally-closed type solenoid valve arranged between the second common hydraulic passage 114 and the lead-in port 26a (26b).

When the in-valves (first in-valve 120, second in-valve 124) are in the open states, if out-valves (first out-valve 128, second out-valve 130) are opened, the brake liquid can be flown into the reservoir unit 132.

When the out-valves (first out-valve 128, second out-valve 130) of this embodiment are opened, the brake fluid can be flown into the reservoir unit 132.

Furthermore, in the second brake system 110a, a pressure sensor Ph is provided to a pipe passage (hydraulic passage) close to the lead-in port 26a. The pressure sensor Ph measures brake fluid pressure which is output from the output port 24a of the motor cylinder device 16, and controlled by the second hydraulic chamber 98a of the motor cylinder device 16. Measurement result signals measured with the pressure sensor Pm, Pp, Ph are input into the control unit 150. And the VSA unit 18 can perform the ABS (Antilock Brake System) control as well as the VSA control.

Furthermore, the constitution in which an ABS unit having only the ABS function is used instead of the VSA unit 18 may be.

The brake system 10 for a vehicle according to this embodiment is constituted basically like the above. Next, an operation and effect of the system 10 will be described in the following.

At the time of normalcy when the brake system 10 for a vehicle operates normally, the master-cut valves (second shutoff valve 60a, first shutoff valve 60b) composed of normally-open type solenoid valves are energized to be valve-closed states. And the third shutoff valve 62 composed of a normally-closed type solenoid valve is energized to be a valve-open state. Therefore, the second hydraulic system 70a and the first hydraulic system 70b are shut off by the master-cut valves. Hence, the brake fluid pressure generated in the master cylinder 34 of the input device 14 is not transmitted to the wheel cylinders 32FR, 32RL, 32RR, 32FL of the disc brake mechanisms 30a to 30d.

At this time, the brake fluid pressure generated in the first pressure chamber 56b of the master cylinder 34 is supplied to the hydraulic chamber 65 of the stroke simulator 64 via the branch hydraulic passage 58c and the third shutoff valve 62 in a valve-open state. The simulator piston 68 is moved against spring force of the first and second return springs 66a, 66b by the brake fluid pressure supplied into the hydraulic chamber 65, so that the stroke of the brake pedal 12 is allowed. Furthermore, the stroke simulator 64 generates pseudo pedal reaction force, and the pseudo pedal reaction force is given to the brake pedal 12. As a result, the driver can get a brake feeling with less incompatible sense.

In such a system state, the control unit 150 determines the current time to be in a braking time when the control unit detects pressing down of the brake pedal 12 by the driver. Then, the control unit 150 drives the electric motor 72 of the motor cylinder device 16 to operate the actuator mechanism 74, so that the slave pistons (second slave piston 88a, first slave piston 88b) are moved in the direction X1 shown in FIG. 1 against the spring force of the second return spring 96a and the first return spring 96b. An operational amount when a slave piston moves is referred to as a slave stroke. The brake fluids in the second hydraulic chamber 98a and the first hydraulic chamber 98b are pressed so as to be balanced according to the movements of the slave pistons. Therefore, a desired brake fluid pressure is generated according to the operational amount (slave stroke) of a slave piston.

Specifically, the control unit 150 calculates a pressing-down operational amount (hereinafter, this is sometimes referred to as "brake-operational amount") of the brake pedal 12 according to a measurement value measured with the pedal stroke sensor St. Then, the control unit 150 sets a brake fluid pressure to be a target pressure based on the calculated brake-operational amount and taking into account regenerative braking force, and lets the motor cylinder device 16 generate the set brake fluid pressure.

In this way, in the motor cylinder device 16 of this embodiment, an operational amount of the actuator (ball screw shaft 80a) is the slave stroke. And in the motor cylinder device 16, the brake fluid pressure according to the slave stroke (operational amount of the actuator) is generated on the brake fluid.

The control unit 150 of this embodiment is composed of peripheral equipments and a microcomputer which includes a CPU (Central Processing Unit), a ROM (Read Only Memory), a RAM (Random Access Memory), and the like. The control unit 150 is constituted to execute a program pre-stored in the ROM by the CPU to control the brake system 10 for a vehicle.

Furthermore, electric signals in this embodiment are control signals to control, for example, the electric power for driving the electric motor 72, and the electric motor 72.

Furthermore, an operational amount measurement unit, which measures the pressing-down operational amount (brake-operational amount) for the brake pedal 12, is not limited to the pedal stroke sensor St, and may be a sensor capable of measuring the pressing-down operational amount for the brake pedal 12. For example, the pressure sensor Pm is adopted as the operational amount measurement unit, and the operational amount measurement unit may be constituted to convert the brake fluid pressure measured with the pressure sensor Pm into the pressing-down operational amount for the brake pedal 12, or may be constituted to measure the pressing-down operational amount (brake-operational amount) for the brake pedal 12 with a pedaling force sensor not shown.

The brake fluid pressures in the second hydraulic chamber 98a and the first hydraulic chamber 98b of the motor cylinder device 16 are transmitted to the wheel cylinders 32FR, 32RL, 32RR, 32FL of the disc brake mechanisms 30a to 30d via the first and the second in-valves 120, 124 of the VSA device 18 in valve-open states. The wheel cylinders 32FR, 32RL, 32RR, 32FL are operated by the brake fluid pressures. Thus the wheel cylinders 32FR, 32RL, 32RR, 32FL operate, so that a desired braking force is given to each of the wheels (WFR, WRL, WRR, WFL).

At the time of abnormality when the motor cylinder device 16 or the like of the brake system 10 for a vehicle according to this embodiment cannot operate normally, the respective master-cut valves are changed to be in the valve-open states, and the third shutoff valve 62 is changed to be in the valve-closed state. Thus the brake fluid pressures generated in the master cylinder 34 are transmitted to the disc brake mechanisms 30a to 30d (wheel cylinders 32FR, 32RL, 32RR, 32FL), so that the disc brake mechanisms 30a to 30d (wheel cylinders 32FR, 32RL, 32RR, 32FL) operate. That is, a brake system of the traditional type hydraulic system becomes active.

At the time of normalcy when the motor cylinder device 16 to function as a hydraulic power source, the control unit 150 to perform the by-wire control, and the like of the brake system 10 for a vehicle according to this embodiment can operate normally, communication between the master cylinder 34, which can generate brake fluid pressure by the driver's operation of the brake pedal 12, and the disc brake mechanisms 30a to 30d (wheel cylinders 32FR, 32RL, 32RR, 32FL) for braking the respective wheels is shut off with the master-cut valves. In this state, the disc brake mechanisms 30a to 30d are operated by brake fluid pressure which the motor cylinder device 16 generates. That is, a brake system of the by-wire brake system becomes active.

In other words, in the brake system 10 for a vehicle at the time of normalcy, the master-cut valves are closed, flowing of the brake fluid between the input device 14 and a combination of the motor cylinder device 16 and the VSA device 18 is shut off.

In this embodiment, a hydraulic system including the input device 14 is referred to as an input side hydraulic system Pin, and a hydraulic system including the motor cylinder device 16 and the VSA device 18 is referred to as an output side hydraulic system Pout. In more detail, a hydraulic system on the side closer to the input device 14 than the master-cut valves (second shutoff valve 60a, first shutoff valve 60b) is referred to as the input side hydraulic system Pin, and a hydraulic system on the side closer to the motor cylinder device 16 than the master-cut valves is referred to as the output side hydraulic system Pout.

In the brake system 10 for a vehicle at the time of normalcy, the communication between the input side hydraulic system Pin and the output side hydraulic system Pout is shut off with the closed master-cut valves, so that each of the input side hydraulic system Pin and the output side hydraulic system Pout becomes a closed hydraulic system.

Furthermore, the input side hydraulic system Pin can generate brake fluid pressure on the brake fluid by using the input device 14, and the output side hydraulic system Pout can generate brake fluid pressure on the brake fluid by using the motor cylinder device 16. Thus each of the two hydraulic systems of the input side hydraulic system Pin and the output side hydraulic system Pout is constituted to be capable of generating brake fluid pressure on the brake fluid.

Furthermore, in this embodiment, when the master-cut valves (second shutoff valve 60a, first shutoff valve 60b) are in the valve-open state, the brake fluid can flow between the input device 14 (input side hydraulic system Pin) and the motor cylinder device 16 (output side hydraulic system Pout), and when the master-cut valves are in the valve-closed state, the flowing of the brake fluid between the input device 14 (input side hydraulic system Pin) and the motor cylinder device 16 (output side hydraulic system Pout) is shut off.

As shown in FIG. 1, the output side hydraulic system Pout includes the disc brake mechanisms 30a to 30d. The disc brake mechanisms 30a to 30d generate heat due to the friction when the frictional braking force is generated to each of the wheels (WFR, WRL, WRR, WFL). The heat generated in the disc brake mechanisms 30a to 30d is transferred to the brake fluid via the wheel cylinders 32FR, 32RL, 32RR, 32FL. Thereby, the brake fluid is heated, so that the temperature of the brake fluid (brake fluid temperature) of the output side hydraulic system Pout rises.

When the brake fluid temperature rises, the brake fluid expands. In the valve-closed state of the master-cut valves, when the brake fluid of the output side hydraulic system Pout expands, the brake fluid does not flow out of the output side hydraulic system Pout, having been a closed system, so that brake fluid pressure of the output side hydraulic system Pout rises. When brake fluid pressure of the output side hydraulic system Pout rises because of the expansion of the brake fluid, an applied output characteristic (hereinafter, this is referred to as fluid pressure output characteristic) of the brake fluid pressure vs. operational amount (slave stroke) of a slave piston changes.

Figure 2:
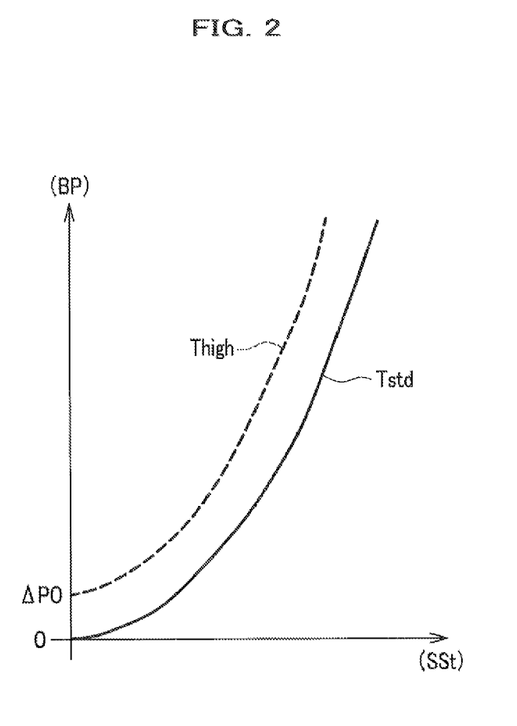
FIG. 2 is a graphic view showing the relation between temperature of brake fluid and output characteristic of brake fluid pressure.

FIG. 2 is a graphical diagram showing the relation of the fluid pressure output characteristic and the brake fluid temperature. In FIG. 2, the vertical axis shows the brake fluid pressure (BP), and the lateral axis shows the slave stroke (SSt).

As shown in FIG. 2, the fluid pressure output characteristic shows characteristic of the brake fluid pressure to be output according to the slave stroke.

The brake system 10 for a vehicle shown in FIG. 1 is designed based on a state where the temperature of the brake fluid is a normal temperature (standard temperature Tstd). As indicated in FIG. 2 by solid line, the motor cylinder device 16 in the brake system 10 for a vehicle is designed so that the brake fluid pressure is zero when the slave stroke is zero and the brake fluid temperature is the standard temperature Tstd. In this embodiment, the fluid pressure output characteristic indicated in FIG. 2 by solid line is the basic characteristic of the motor cylinder device 16. The basic characteristic is set beforehand when the motor cylinder device 16 is designed.

When the brake fluid of the output side hydraulic system Pout is heated, so that the brake fluid temperature rises to some temperature Thigh (Thigh>Tstd), the brake fluid expands. If it is in the case of the valve-closed state of the master-cut valves, the brake fluid pressure of the output side hydraulic system Pout rises as described above. That is, the brake fluid pressure becomes higher for the slave stroke SSt than in the case of the standard temperature Tstd of the brake fluid temperature.

As indicated in FIG. 2 by broken line, in the case of temperature Thigh of the brake fluid temperature, a minute brake fluid pressure ΔP0 occurs when the slave stroke SSt is zero. Furthermore, the brake fluid pressure becomes higher for the same slave stroke SSt than in the case of the standard temperature Tstd of the brake fluid temperature.

In this way, the fluid pressure output characteristic changes from the basic characteristic according to a change in temperature as the brake fluid temperature rises.

As indicated in FIG. 2 by a broken line, the fluid pressure output characteristic shifts to the higher brake fluid pressure zone from the basic characteristic (solid line) according to the change in temperature as the brake fluid temperature rises.

As described above, the brake system 10 for a vehicle (motor cylinder device 16) shown in FIG. 1 is designed on the assumption that the brake fluid temperature is the standard temperature Tstd. And furthermore, the control unit 150 is constituted so that the most suitable braking force occurs to each of the wheels (WFR, WRL, WRR, WFL) when the brake fluid temperature is the standard temperature Tstd. That is, the brake system 10 for a vehicle is constituted so that the most suitable braking force occurs to each wheel when the fluid pressure output characteristic of the motor cylinder device 16 is the standard characteristic.

Therefore, when the fluid pressure output characteristic shifts from the standard characteristic according to rising of the brake fluid temperature, the control unit 150 cannot give an accurate braking force to each wheel. That is, an error arises for the braking force which occurs to each wheel.

Therefore, the control unit 150 of this embodiment controls the brake system 10 for a vehicle so that the fluid pressure output characteristic of the motor cylinder device 16 approaches the standard characteristic when the fluid pressure output characteristic shifts from the basic characteristic according to rising of the brake fluid temperature or the like.

Especially when the brake fluid pressure output from the motor cylinder device 16 becomes higher than on the basic characteristic, in other words, when the fluid pressure output characteristic shifts to the higher pressure side than the basic characteristic, the control unit 150 determines that the fluid pressure output characteristic has shifted from the basic characteristic.

Figure 3:
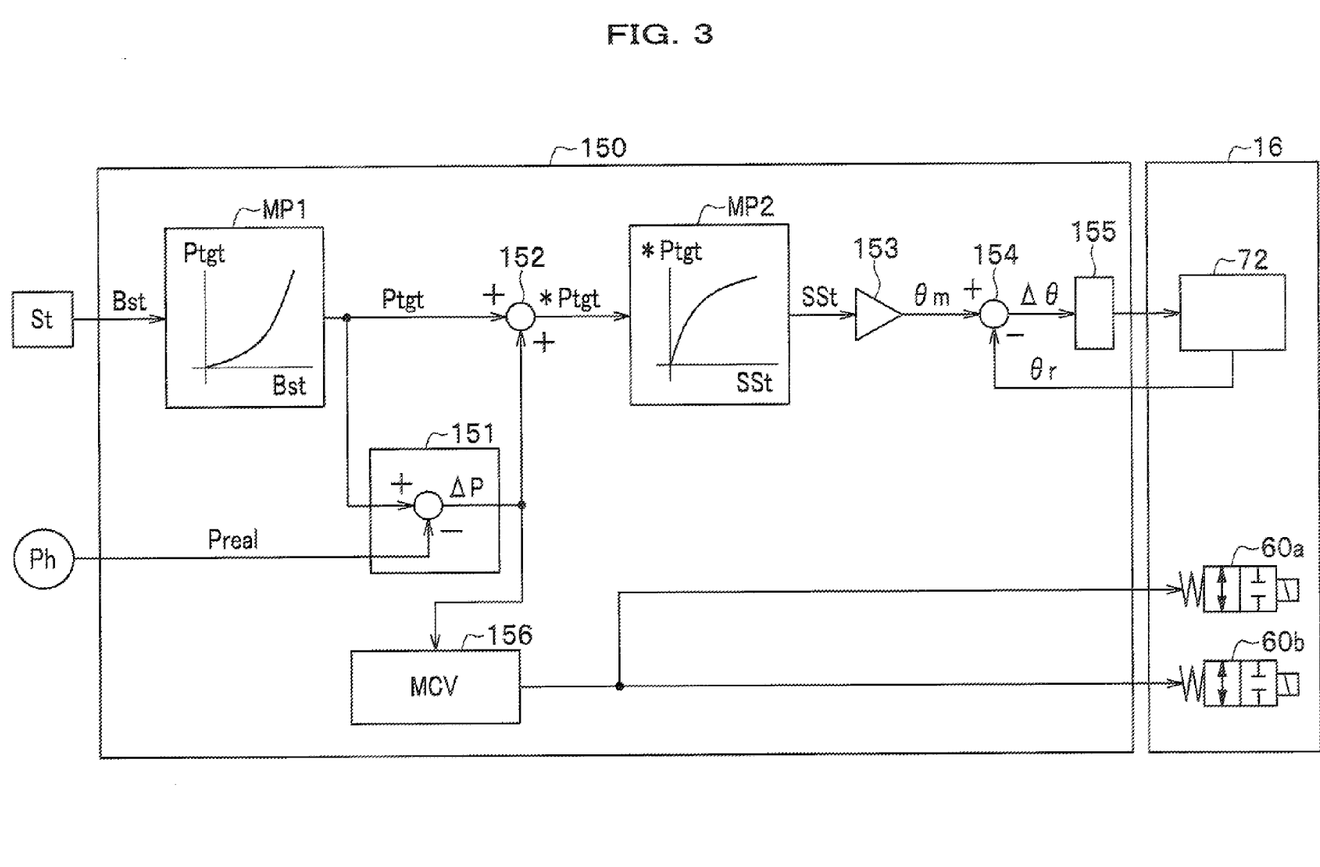
FIG. 3 is a functional block diagram of a control unit.

FIG. 3 is a functional block diagram of the control unit 150.

As shown in FIG. 3, the control unit 150 has a standard hydraulic map MP1. The standard hydraulic map MP1 is a map showing the relation of the target value (target fluid pressure Ptgt) of the brake fluid pressure and the brake-operational amount (Bst) when the brake fluid temperature is the standard temperature Tstd. The standard hydraulic map MP1 is set beforehand as the characteristic of the vehicle not shown.

The control unit 150 calculates the brake-operational amount (Bst) according to the measurement value of the pedal stroke sensor St, and sets the target fluid pressure Ptgt corresponding to the brake-operational amount based on the standard hydraulic map MP1.

The control unit 150 includes a fluid pressure correcting portion 151. The fluid pressure correcting portion 151 calculates the brake fluid pressure to be output from the motor cylinder device 16 (refer to FIG. 1) based on the measurement signal input from the pressure sensor Ph. The brake hydraulic pressure calculated by the fluid pressure correcting portion 151 is referred to as a real fluid pressure (Preal). The fluid pressure correcting portion 151 calculates the fluid pressure deviation ($\Delta P$) to be obtained by subtracting the real fluid pressure from the target fluid pressure.

The control unit 150 includes an adder 152. The adder 152 calculates a corrected target fluid pressure (*Ptgt) by adding the target fluid pressure and the fluid pressure deviation calculated by the fluid pressure correcting portion 151.

The control unit 150 includes a slave stroke map (SS map MP2). The SS map MP2 is a map showing the relation of the slave stroke (SSt) and the corrected target fluid pressure (*Ptgt). The SS map map MP2 is set beforehand as the characteristic of the motor cylinder device 16 (refer to FIG. 1). The control unit 150 calculates the slave stroke corresponding to the corrected target fluid pressure based on the SS map MP2.

The control unit 150 includes a motor angle setting portion 153. The motor angle setting portion 153 converts the slave stroke (SSt) calculated based on the SS map MP2 into a driving amount (motor angle $\theta m$) of the electric motor 72.

For example, the motor angle setting portion 153 includes a map (not shown) showing the motor angle ($\theta m$) of the electric motor 72 versus the slave stroke (SSt). The motor angle setting portion 153 sets the motor angle ($\theta m$) corresponding to the slave stroke (SSt) based on this map.

The control unit 150 includes an adder-subtracter 154. The adder-subtracter 154 calculates a motor angle deviation ($\Delta \theta$) to be obtained by subtracting the real motor angle (real motor angle $\theta r$) from the motor angle ($\theta m$) set by the motor angle setting portion 153. Note that, the real motor angle ($\theta r$) is detected by a hall sensor (not shown) provided to the electric motor 72.

The control unit 150 includes a motor control portion 155. The motor control portion 155 calculates a control amount for the electric motor 72 based on the motor angle deviation ($\Delta \theta$) calculated by the adder-subtracter 154. And then, the motor control portion 155 drives the electric motor 72 based on the calculated control amount.

In this way, the control unit 150 drives the electric motor 72 of the motor cylinder device 16 based on the brake-operational amount, so that the motor cylinder device 16 generates the brake fluid pressure corresponding to the brake-operational amount.

Furthermore, the control unit 150 includes a MCV control portion 156. The MCV control portion 156 controls the master-cut valves (second shutoff valve 60a, first shutoff valve 60b) of the motor cylinder device 16. The MCV control portion 156 controls the master-cut valves based on the fluid pressure deviation ($\Delta P$) between the target fluid pressure (Ptgt) and the real fluid pressure (Preal).

As indicated in FIG. 2 by broken line, when the brake fluid temperature rises to some temperature Thigh from the standard temperature Tstd, the fluid pressure output characteristic shifts to the higher pressure side than the basic characteristic, so that the brake fluid pressure to be output from the motor cylinder device 16 (refer to FIG. 1) becomes higher. Namely, the fluid pressure deviation ($\Delta P$) always occurs between the target fluid pressure (Ptgt) and the real fluid pressure (Preal). Furthermore, because the real fluid pressure becomes higher than the target fluid pressure, the fluid pressure deviation, which is obtained by subtracting the real fluid pressure from the target fluid pressure, always becomes negative.

Therefore, when the brake pedal 12 (refer to FIG. 1) is pressed down, and the negative fluid pressure deviation ($\Delta P$) having the prescribed size occurs continuously, the MCV control portion 156 determines that the fluid pressure output characteristic has shifted from the basic characteristic.

For example, the MCV control portion 156 determines that the fluid pressure output characteristic has shifted from the basic characteristic when the fluid pressure deviation ($\Delta P$) between the target fluid pressure (Ptgt) for the brake-operational amount and the real fluid pressure (Preal) is lower than a prescribed threshold. The threshold, by use of which the MCV control portion 156 determines that the fluid pressure output characteristic has shifted from the basic characteristic, is set beforehand as a design value for the brake system 10 for a vehicle (refer to FIG. 1).

When the MCV control portion 156 determines that the fluid pressure output characteristic has shifted from the basic characteristic, and the brake pedal 12 (refer to FIG. 1) is pressed down, the MCV control portion 156 opens the master-cut valves (second shutoff valve 60a, first shutoff valve 60b). When the master-cut valves are opened, the input side hydraulic system Pin (input device 14) and the output side hydraulic system Pout (motor cylinder device 16) of the brake system 10 for a vehicle shown in FIG. 1 are communicated. And then, the brake fluid of the output side hydraulic system Pout flows into the input side hydraulic system Pin. Thereby, the brake fluid of the output side hydraulic system Pout disperses by flowing into the input side hydraulic system Pin, so that the brake fluid pressure of the output side hydraulic system Pout lowers.

At this time, the MCV control portion 156 (refer to FIG. 3) controls the opening degree of the master-cut valves by adjusting the duty ratio of the control signal (current signal or voltage signal) for controlling the master-cut valves. The amount of the brake fluid to flow into the input side hydraulic system Pin from the output side hydraulic system Pout is controlled according to the opening degree of the master-cut valves.

For example, if the opening degree of the master-cut valves for the fluid pressure deviation (ΔP) is set beforehand, the MCV control portion 156 can set the opening degree of the master-cut valves based on the fluid pressure deviation. And then, the MCV control portion 156 opens the master-cut valves at the set opening degree. Specifically, the MCV control portion 156 adjusts the duty ratio of the control signal so that the opening degree of the master-cut valves becomes to be the set opening degree.

Furthermore, the MCV control portion 156 close the master-cut valves when the brake pedal 12 (refer to FIG. 1) is released, that is, the brake-operational amount becomes zero.

Figure 4A:
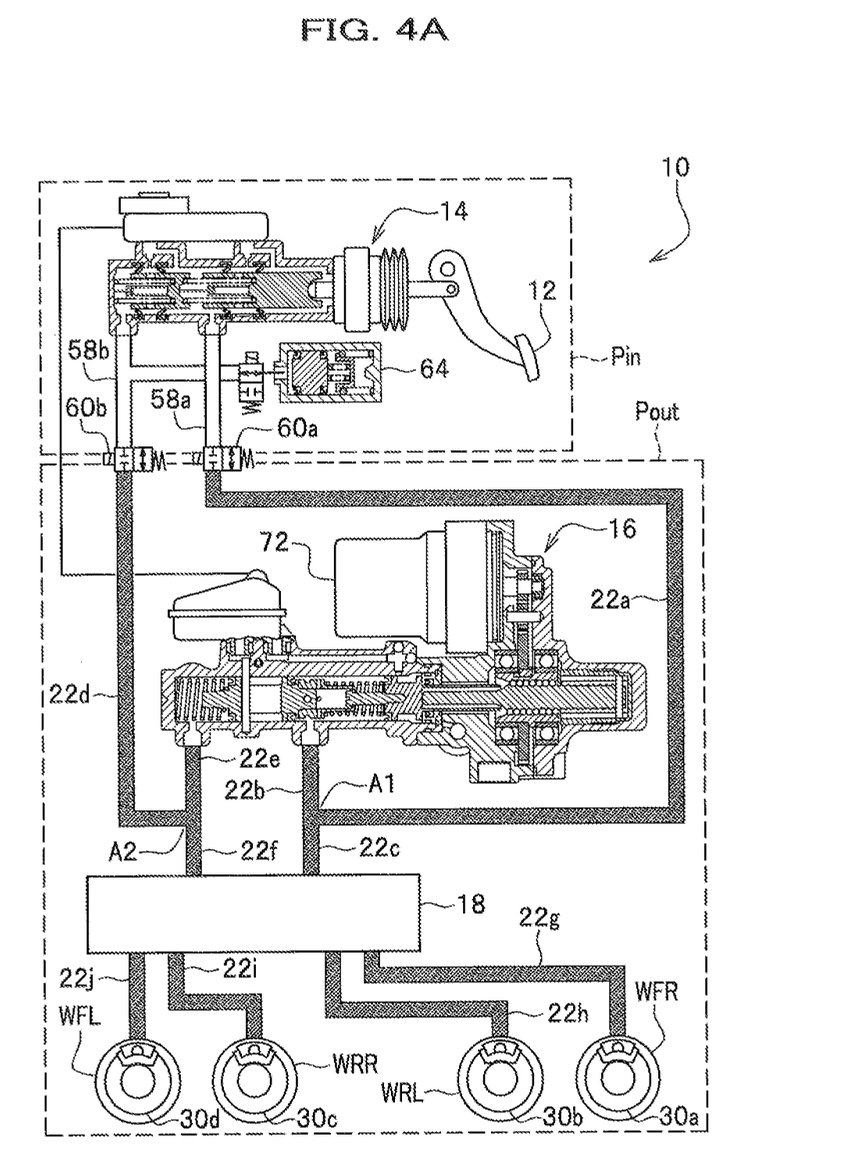
FIG. 4A is a schematic view showing a case where the temperature of the brake fluid rises in a closed state of master-cut valves.
Figure 4B:
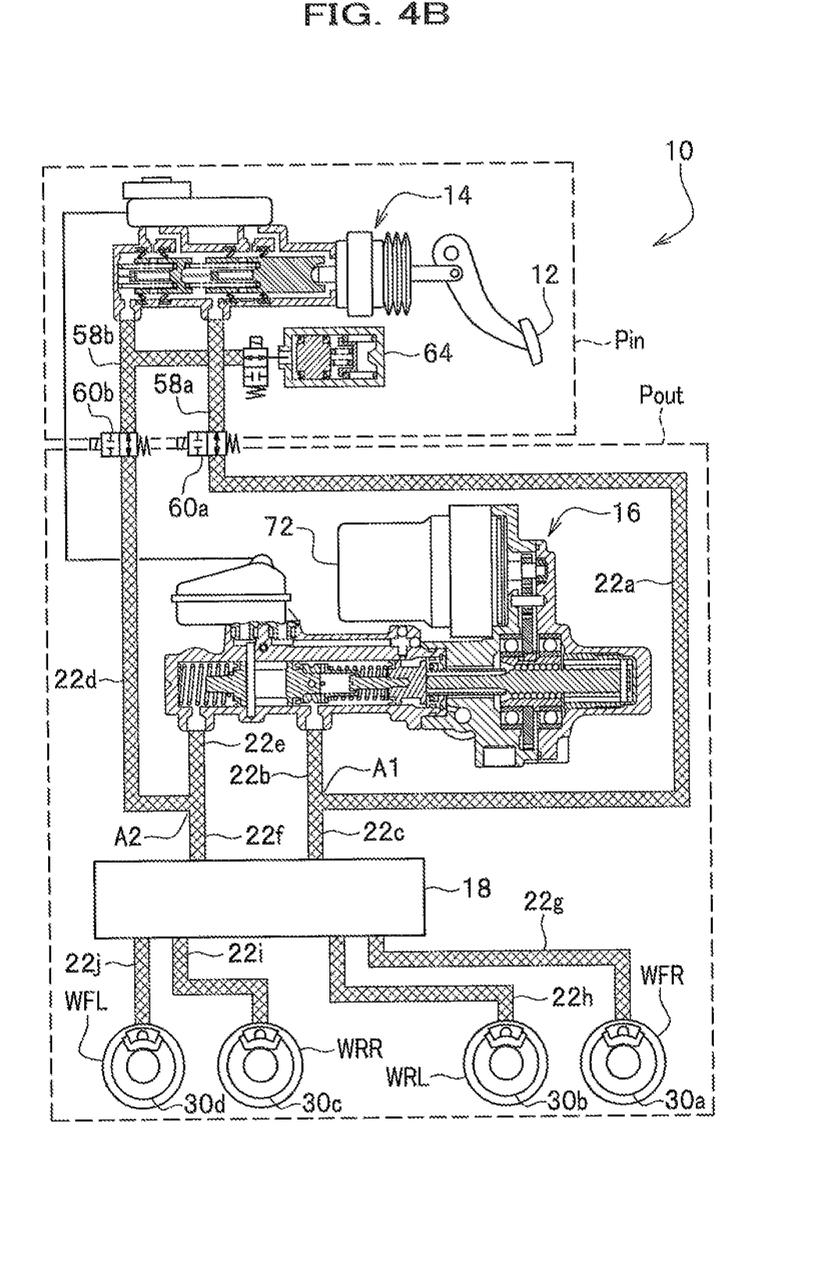
FIG. 4B is a schematic view showing a case where the temperature of the brake fluid rises in an open state of the master-cut valves.

FIG. 4A is a schematic view showing the case where the brake fluid temperature rises in the closed state of the master-cut valves, and FIG. 4B is a schematic view showing the case where the brake fluid temperature rises in the open state of the master-cut valves.

Conventionally, in the brake system 10 for a vehicle at the normal time, the master-cut valves (second shutoff valve 60a, first shutoff valve 60b) are closed as shown in FIG. 4A. When the brake fluid is heated by the frictional heat generated in the disc brake mechanisms 30a to 30d, the brake fluid in the piping tubes 22a to 22j of the output side hydraulic system. Pout expands. This is shown by dark shadow. Thereby, the brake fluid pressure of the output side hydraulic system Pout rises. Therefore, the brake fluid pressure to be output from the motor cylinder device 16 becomes higher than on the basic characteristic. And the fluid pressure output characteristic shifts to the higher side than the basic characteristic.

As shown in FIG. 4B, when the master-cut valves (second shutoff valve 60a, first shutoff valve 60b) are opened, the brake fluid in the piping tubes 22a, 22d flows into the second hydraulic passage 58a, the first hydraulic passage 58b, respectively. Therefore, the brake fluid pressure of the output side hydraulic system Pout including the piping tubes 22a to 22j lowers. This is shown by mesh. That is, the brake fluid in the piping tubes 22a to 22j flows into the input side hydraulic system Pin by opening the master-cut valves (second shutoff valve 60a, first shutoff valve 60b). And then, the brake fluid pressure of the output side hydraulic system Pout, where the fluid pressure rises because of the expansion of the brake fluid, lowers.

In this way, the control unit 150 shown in FIG. 3 (MCV control portion 156) lowers the brake fluid pressure of the output side hydraulic system Pout by controlling the opening degree of the master-cut valves when the brake fluid pressure rises according to rising of the brake fluid temperature of the output side hydraulic system Pout, and the brake pedal 12 (refer to FIG. 1) is pressed down. Thereby, the fluid pressure output characteristic in the case where the brake fluid temperature is higher than the standard temperature Tstd, approaches the basic characteristic. The motor cylinder device 16 (refer to FIG. 3) generates the brake fluid pressure on the fluid pressure output characteristic near the basic characteristic when the brake fluid temperature is the standard temperature Tstd, thereby the braking force occurs to each of the wheels (WFR, WRL, WRR, WFL). In this way, the control unit 150 generates an accurate braking force according to the brake-operational amount, so that the accurate braking force can be applied to each of the wheels (WFR, WRL, WRR, WFL).

Furthermore, in the brake system 10 for a vehicle shown in FIG. 10, when the input side hydraulic system Pin and the output side hydraulic system Pout communicate with each other by opening of the master-cut valves, the amount of the brake fluid of the output side hydraulic system Pout decreases. In this case, if the slave pistons (second slave piston 88a, first slave piston 88b) of the motor cylinder device 16 excessively move, the brake liquid of the output side hydraulic system Pout further flows into the input side hydraulic system Pin, so that the brake fluid of the output side hydraulic system Pout sometimes becomes insufficient.

Therefore, the control unit 150 may be constituted to restrict the slave stroke when the MCV control portion 156 (refer to FIG. 3) opens the master-cut valves. For example, if a limiting value for the slave stroke is set beforehand, which value corresponds to the opening degree (duty ratio of the control signal for controlling the master-cut valves) of the master-cut valves, the control unit 150 can control the slave stroke correspondingly to the opening degree of the master-cut valves. In this way, the slave stroke is restricted, so that the brake liquid of the output side hydraulic system Pout is prevented from becoming insufficient.

As described above, at the normal time, the brake system 10 for a vehicle of this embodiment shown in FIG. 1 closes the master-cut valves (second shutoff valve 60a, first shutoff valve 60b) to shut off the communication between the input side hydraulic system Pin (input device 14) and the output side hydraulic system Pout (motor cylinder device 16 and VSA device 18). And when the brake fluid pressure of the output side hydraulic system Pout rises according to rising of the brake fluid temperature, the master-cut valves are opened to make communication of the input side hydraulic system Pin and the output side hydraulic system Pout.

Thereby, the brake fluid of the output side hydraulic system Pout flows into the input side hydraulic system Pin, so that the brake fluid pressure of the output side hydraulic system Pout lowers. And then, the fluid pressure output characteristic in the case where the brake fluid temperature of the output side hydraulic system Pout rises comes near the basic characteristic in the case where the brake fluid temperature is the standard temperature Tstd. The motor cylinder device 16 (refer to FIG. 1) generates the brake fluid pressure on the fluid pressure output characteristic close to the basic characteristic to give the accurate braking force to each of the wheels (WFR, WRL, WRR, WFL).

Furthermore, the control unit 150 (MCV control portion 156) controls the opening degree of the master-cut valves to control the amount of the brake fluid to flow into the input side hydraulic system Pin from the output side hydraulic system Pout. The brake fluid is prevented from excessively flowing into the input side hydraulic system Pin from the output side hydraulic system Pout, so that a shortage of the brake fluid of the output side hydraulic system Pout is prevented. Therefore, a shortage of the brake fluid to be supplied to each of the wheel cylinders 32FR, 32RL, 32RR, 32FL is prevented, so that a shortage of the frictional braking force to be generated in the disc brake mechanisms 30a to 30d is prevented.

Furthermore, when the master-cut valves are opened, displacements (slave strokes) of the slave pistons (second slave piston 88a, first slave piston 88b) are restricted. Thereby, a shortage of the brake fluid of the output side hydraulic system Pout due to excessive displacements of the slave pistons is prevented, so that a shortage of the frictional braking force to be generated in the disc brake mechanisms 30a to 30d is prevented.

Furthermore, when the brake pedal 12 (refer to FIG. 1) is not pressed down and, for example, at the time of operating of a collision reducing or avoiding brake, or at the time of decelerating in an auto-cruising control, it is preferable that the control unit 150 (refer to FIG. 3) of this embodiment opens the master-cut valves upon determining that the fluid pressure output characteristic has shifted from the basic characteristic.

Furthermore, the present invention is not limited to the embodiment described above, and can be modified within the purport of the invention.

For example, an embodiment may be constituted so that upon determining that the fluid pressure output characteristic has shifted from the basic characteristic, the control unit 150 opens the out-valves (first out-valve 128, second out-valve 130) of the VSA device 18 instead of the master-cut valves (second shutoff valve 60a, first shutoff valve 60b) shown in FIG. 1.

When the out-valves are opened, the brake fluid of the output side hydraulic system Pout flows into the reservoir unit 132. Therefore, the amount of the brake fluid of the output side hydraulic system Pout decreases, so that the brake fluid pressure lowers. In this way, the brake fluid pressure of the output side hydraulic system Pout lowers also when the out-valves of the VSA device 18 are opened, so that the fluid pressure output characteristic in the case where the brake fluid temperature rises comes near the basic characteristic.

Furthermore, an embodiment may be constituted so that upon determining that the fluid pressure output characteristic has shifted from the basic characteristic, the control unit 150 opens the master-cut valves and the out-valves together.

Note that, the pump 136 needs to be driven to return the brake fluid flown into the reservoir unit 132 to the output side hydraulic system Pout. That is, operating noise of the motor M occurs when the brake fluid is returned to the output side hydraulic system Pout. Therefore, the constitution that the master-cut valves (second shutoff valve 60a, first shutoff valve 60b) are opened when the fluid pressure output characteristic shifts from the basic characteristic can better prevent occurring of the operating noise.

Furthermore, the control unit 150 (MCV control portion 156) of this embodiment determines the shift of the fluid pressure output characteristic based on the fluid pressure deviation. However, the method that the MCV control portion 156 determines the shift of the fluid pressure output characteristic is not limited to that.

For example, as indicated in FIG. 2 by broken line, the brake fluid pressure of the output side hydraulic system Pout rises when the brake fluid temperature rises from the standard temperature Tstd. Thus the minute brake fluid pressure $\Delta P0$ occurs when the slave stroke SSt is zero. That is, when the brake fluid temperature rises, real fluid pressure becomes the pressure $\Delta P0$ at the time of zero of the brake-operational amount and zero of the target fluid pressure.

Therefore, the MCV control portion 156 may be constituted to determine that the fluid pressure output characteristic shifts from the basic characteristic because the brake fluid pressure rises because of rising of the brake fluid temperature or the like when the real fluid pressure is the pressure $\Delta P0$ at the time of zero of the target fluid pressure, that is, when the minute brake fluid pressure $\Delta P0$ occurs at the time of zero of the brake-operational amount.

And an embodiment may be constituted so that the MCV control portion 156 (refer to FIG. 3) of the control unit 150 opens the master-cut valves (second shutoff valve 60a, first shutoff valve 60b) when the brake pedal 12 (refer to FIG. 1) is pressed down.

DESCRIPTION OF REFERENCE SYMBOLS

10 Brake system for vehicle
14 Input device
16 Motor cylinder device (fluid pressure generating device)
60a Second shutoff valve (master-cut valve)
60b First shutoff valve (master-cut valve)
128 First out-valve (out-valve)
130 Second out-valve (out-valve)
132 Reservoir unit
150 Control unit
Pin input side hydraulic system
Pout Output side hydraulic system

What is claimed is:

1. A brake system for a vehicle including two hydraulic systems comprising an input side hydraulic system and an output side hydraulic system, each of the two hydraulic systems being capable of generating brake fluid pressure on a brake fluid, said brake system comprising:
   an input device configured to generate a first brake fluid pressure in the input side hydraulic system according to an operational amount of pressure applied to an operation piece, the input device being disposed in the input side hydraulic system;
   a fluid pressure generating device comprising an actuator configured to generate a second brake fluid pressure in the output side hydraulic system according to the operational amount of pressure applied to the operation piece, the fluid pressure generating device being disposed in the output side hydraulic system ;
   a master-cut valve configured to selectively flow the brake fluid between the input side hydraulic system and the output side hydraulic system when opened, and to shut off flowing of the brake fluid between the input side hydraulic system and the output side hydraulic system when closed;
   an outlet-valve through which the brake fluid can flow into a reservoir unit when opened; and
   a control unit which, when the operation piece is operated, closes the master-cut valve and the outlet-valve and controls the actuator to generate the second brake fluid pressure according to a sensed value of the operational amount of pressure applied to the operation piece, wherein the control unit is configured to open one or both of the master-cut valve and the outlet-valve when the control unit determines that an applied output characteristic of the second brake fluid pressure, according to an operational amount of the actuator, shifts from a basic output characteristic, set beforehand and stored in memory, to a modified output characteristic, in which a minute brake fluid pressure occurs in the output side hydraulic system when the operational amount of the actuator is zero.

2. The brake system for a vehicle according to claim 1, wherein the control unit is configured to open the master-cut valve when the control unit determines that the applied output characteristic shifts from the basic output characteristic.

3. The brake system for a vehicle according to claim 1, wherein the control unit is configured to restrict the operational amount of the actuator and to open the master-cut valve when the control unit determines that the applied output characteristic shifts from the basic output characteristic.

4. The brake system for a vehicle according to claim 2, wherein the control unit is configured to restrict the operational amount of the actuator and to open the master-cut valve when the control unit determines that the applied output characteristic shifts from the basic output characteristic.

5. The brake system for a vehicle according to claim 1, wherein the control unit determines that the applied output characteristic shifts from the basic output characteristic when the output characteristic shifts to a higher brake fluid pressure zone from the basic output characteristic.

6. The brake system for a vehicle according to claim 2, wherein the control unit determines that the applied output characteristic shifts from the basic output characteristic when the output characteristic shifts to a higher brake fluid pressure zone from the basic output characteristic.

7. The brake system for a vehicle according to claim 3, wherein the control unit determines that the applied output characteristic shifts from the basic output characteristic when the output characteristic shifts to a higher brake fluid pressure zone from the basic output characteristic.

8. The brake system for a vehicle according to claim 4, wherein the control unit determines that the applied output characteristic shifts from the basic output characteristic when the output characteristic shifts to a higher brake fluid pressure zone from the basic output characteristic.

* * * * *